Aug. 8, 1961 W. F. PENROD 2,995,218
FLUID PRESSURE BRAKE SYSTEM AND ACTUATING UNIT THEREFOR
Filed Feb. 20, 1959 2 Sheets-Sheet 1

INVENTOR.
William F. Penrod
BY
ATT'YS

Aug. 8, 1961 W. F. PENROD 2,995,218
FLUID PRESSURE BRAKE SYSTEM AND ACTUATING UNIT THEREFOR
Filed Feb. 20, 1959 2 Sheets-Sheet 2

INVENTOR.
William F. Penrod
BY
Murray, Sackhoff + Murray
ATT'YS

United States Patent Office 2,995,218
Patented Aug. 8, 1961

2,995,218
FLUID PRESSURE BRAKE SYSTEM AND ACTUATING UNIT THEREFOR
William F. Penrod, 2795 Montana Ave., Cincinnati, Ohio
Filed Feb. 20, 1959, Ser. No. 794,543
8 Claims. (Cl. 188—152)

The present invention relates to fluid pressure braking systems and is particularly directed to improvements in such systems that have independently operated sets of brakes for the front and the rear wheels of automobiles, and the like.

Approved automotive braking systems now in use develop a braking ratio between the front and the rear wheel brakes whereby the front wheels perform 60% of the total braking work whilst the rear wheels do the remaining 40% of the work over the entire braking range. This 6 to 4 ratio produces optimum braking conditions for effective deceleration of an automobile but creates undue wear on the front wheel tires and the front wheel brake shoe linings with respect to the corresponding back wheel parts whilst causing loss of steering control of the front wheels when the automobile is braked on slippery pavements, gravel, and the like.

According to the present invention I provide a system that has simultaneously actuated, independent braking sets for the front and the rear wheels of an automobile which normally supplies fluid under uniform pressure to the front wheel brake sets and the back wheel brake sets whereby all the brakes perform equal braking work, and I further provide a prestressed spring means associated with the rear wheel brake set only, for the purpose of obtaining optimum braking condition upon the attainment of a predetermined, intermediate braking pressure in said set, which condition will prevail to effectively decelerate the automobile when quick and/or heavy stops are required.

Another object of the invention is to provide a dual fluid pressure brake system for automobiles that will normally deliver a uniform braking action to all of the wheels but when a call is made on the system to secure heavy and/or quick braking action an automatic means will become effective to cause the front wheels to perform 60% of the total work to bring the automobile to an effective stop.

A further object of this invention is to provide a braking system wherein the front and rear brake sets will be self-correcting in normal use and tend to adjust toward an equal braking ratio even though the sets were inexpertly set at a substantially different ratio or the sets were worn out of properly adjusted ratio by a period of too frequent and heavy stops requiring the automatic 6 to 4 full braking ratio of this invention.

Other objects and advantages of the invention will appear from the following description taken in connection with the drawings forming a part of this specification, and in which.

Figure 2:
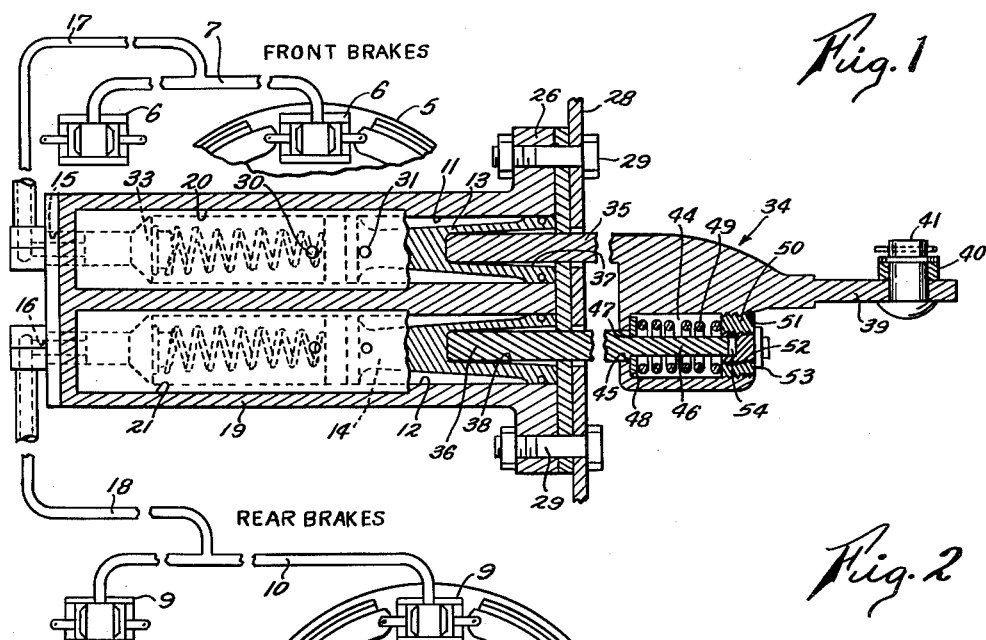
FIG. 2 is a section taken on line 2—2 of FIG. 1 showing diagrammatically other parts of my braking system.

Referring in detail particularly to FIG. 2 of the drawing it will be understood that I have illustrated the front wheel brakes 5 of an automobile each having a cylinder 6 for applying said front wheel brakes in unison, the cylinders being interconnected by branch pressure or fluid line 7. The automobile also has a pair of rear wheel brakes 8 each having a wheel cylinder 9 for applying its brake and interconnected with each other by a branch or fluid line 10. Preferably all of the brake shoes have the same braking surfaces and all of the wheel cylinders are identical in that they have the same internal measurements and each of the pistons therein have the same effective pressure producing areas. The independent means for simultaneously supplying fluid under pressure to the front and to the rear wheel cylinders comprises a first master cylinder 11 and a second master cylinder 12 disposed in parallel juxtaposition to cylinder 11, and each being provided with a pressure exerting piston 13 and 14, respectively, that is axially movable therein. With reference to FIG. 2 it is preferable that the internal diameters of the cylinders be identical and that the effective pressure exerting faces of the pistons have the same areas whereby upon in-step movement of said pistons in the cylinders, uniform pressure will be delivered through outlet ports 15 and 16, respectively, of the master cylinders 11 and 12. A brake pressure or fluid line 17 is connected with the outlet port of the first master cylinder 11 and communicates with the branch or fluid line 7 interconnecting the front wheel cylinders 6, whilst a brake pressure or fluid line 18 leads from the port 16 in the second cylinder 12 and is connected to branch or fluid line 10 of the rear wheel cylinders 9. Thus when the dual cylinder is operated, uniform pressure is normally applied to each set of brakes, each set being actuated by one only of the brake master cylinders.

The cylinders 11 and 12 are preferably formed in a master cylinder casting 19 which has fluid supply reservoirs 20 and 21 located therein above the respective cylinders 11 and 12, said reservoirs being closed by a cover 22 secured to the casting by a bolt 23. Each reservoir is provided with a replenishing plug 24 threaded in a threaded bore formed in the cover directly above it, said plug having the usual breather hole 25 formed therethrough.

The master cylinder casting has an integral mounting flange 26 which is secured to a back-up plate 27 and the fire wall 28 of an automobile body by means of bolts 29 which pass through aligned openings formed in said parts. The reservoirs and the respective cylinders communicate with each other by the customary vent holes 30 and 31 and the pistons 13 and 14 are returned to their inoperative retracted positions by the usual springs 32 engaging the effective faces of each piston 13, 14, at one end and anchored at their opposed ends against conventional outlet devices 33 located in the forward ends of the cylinders 11 and 12.

The means or actuating unit for actuating the axial movement of pistons 13 and 14 under normal or other conditions described herein, comprises a body member or piston thrust fork 34 having first and second finger means 35, 36, respectively each parallel to the other and each extending forwardly from the body member 34, the ends of both fingers projecting into outwardly divergent sockets 37 and 38 formed in the pistons 13 and 14, respectively, each being held securely to the piston of its associated cylinder, thereby directly co-acting with its respective piston.

As best shown in FIG. 2, finger means 35 is rigidly mounted to the body member 34 and provides for a non-yielding operating thrust to piston 13 by axial and co-linear movement with such piston, whenever a force is applied to body member 34 through movement of end 39. Similarly, finger means 36 provides for an operating thrust to piston 14 by axial and co-linear movement with such piston. In this instance, a fixed relation exists between finger 36, and the body 34 and finger 35. However, under certain other conditions, relative axial movement is provided for, between the finger means 35 and 36 so that an unequal braking pressure is developed and established between the two independent sets of brakes. Both kinds of conditions are met by providing for a yielding means for finger 36 and which is responsive only to a predetermined, intermediate braking pressure in the system. The yielding or pressure responsive contractile means is provided in a bore 44 of body member 34, which bore is in axial alignment with finger 36 and piston 14. An extension or reduced diameter portion 46 associated with, and which is integral with finger 36 in this embodiment, is received into bore 44 through aperture 45 of body member 34 and about which a prestressed spring 49 is coiled or wound between the ends of the bore.

Fixed limit means for the relative rearward movement of finger 36 is provided in bore 44. A movable washer 48 mounted on extension 46 engages a shoulder 47 of finger 36 and the end of the bore adjacent finger 36, and is held in such engagement by the action of or cooperation with spring 49. Such cooperation prevents finger 36 to enter past aperture 45 into bore 44 under normal conditions of braking pressure, i.e., when the predetermined intermediate pressure of the system has not been attained.

A stop means for finger 36 and its reduced portion 46 is provided at the other end of bore 44, which means provides for the continuation of the forward movement of finger 36 after the yielding means has yielded and a predetermined unequal braking pressure has been established in the system or, in particularly, between the sets of brakes. Such stop means preferably comprises an externally-threaded plug 50 screwed to threads 51 made at the mouth of bore 44 in the body member 34, and which plug has a concentric tapped bore 52 formed therethrough for receiving a set screw 53. The set screw is provided with a hole 54 for slidably receiving the terminal end of the arm portion 46 in the use of the system, with such end being spaced from the bottom of the hole 54 under normal conditions. In practice this spacing is preferably between $1/16$ to $1/32$ of an inch. Upon a force being applied to the body member 34, such body advances forwardly towards the brake master cylinders. A uniform pressure is developed in the brake system, with a resultant uniform braking ratio being effected simultaneously between the independent sets of brakes. The yielding means cooperates with finger 36 in the following manner: The tension which spring 49 exerts upon washer 48 maintains the latter against shoulder 47 of the finger 36 and the end of the bore, and thusly, finger 36 is displaced forwardly the same distance as that of finger 35. The fluid pressure in the system, and in particularly, in cylinder 12 and its associated set of brakes, continues to increase until such time that the pressure in cylinder 12 reacts in an equal and opposite direction to the tension exerted by spring 49 on washer 48, such time coincident with the intermediate predetermined braking pressure. The result is that the tension in the spring yields, body member 34 slides axially across finger 36 until the terminal end of reduced portion 46 engages the stop provided by set screw 53 and the bottom of the hole 54 therein. Because finger 35 is rigidly fixed to body member 34, it has advanced over distance advanced by finger 36 a predetermined distance equal to the spacing provided in set screw 53. It should be noted that washer 48 is always maintained against shoulder 47 of finger 36 due to tension in spring 49 thereagainst, although the end of the bore 44 slides along finger 36 after the braking pressure developed through cylinder 12 overequalizes the effect of the tension of spring 49. Therefore, the brake set served by the piston 13 will receive extra pressure fluid and thereby perform say, for example, 60% of the braking work whilst the rear brake set will momentarily receive little or no braking fluid and will perform the remaining 40% of such work.

Figure 1:
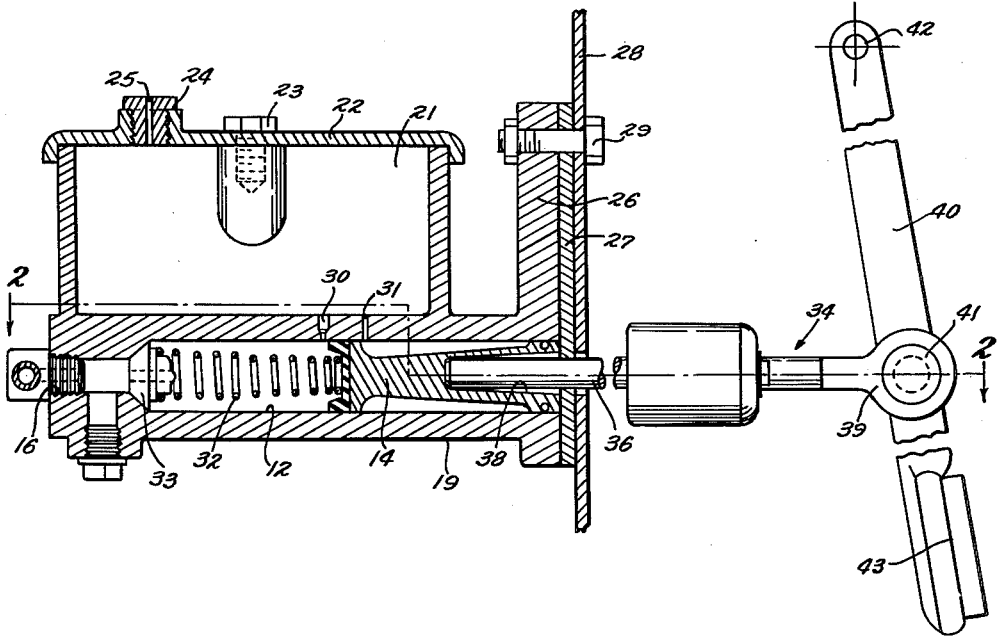
FIG. 1 is a vertical section through one of the master cylinders of my system, parts thereof being shown in fragmental elevation.
Figure 3:
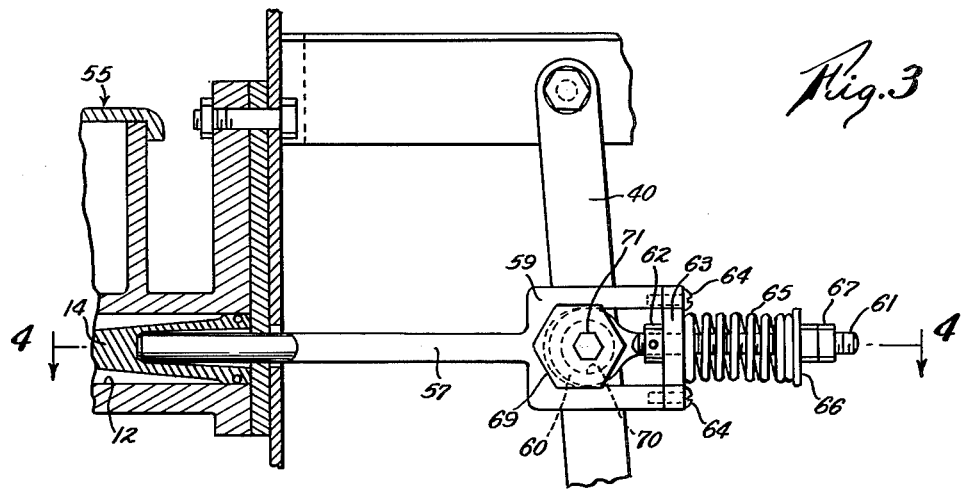
FIG. 3 is a fragmental, sectional view of a modified form of my invention, some parts being illustrated in elevation.
Figure 4:
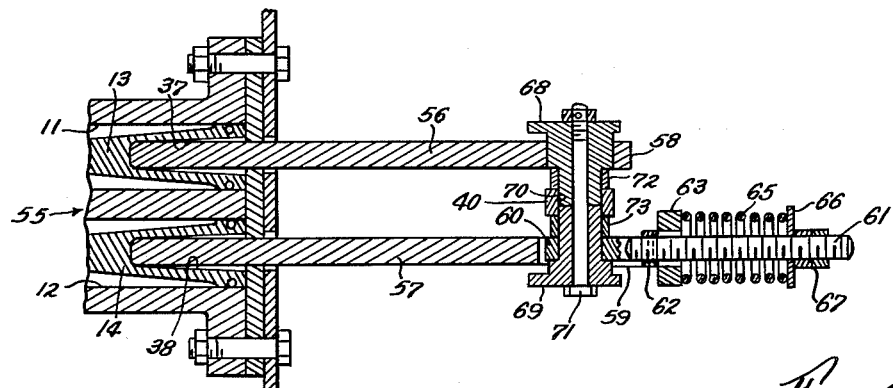
FIG. 4 is a section taken on line 4—4 of FIG. 3.

A modified form of my invention is illustrated in FIGS. 3 and 4 wherein the numeral 55 indicates a dual master cylinder, identical to that illustrated in FIGS. 1 and 2, which has cylinders 11 and 12 serving the front brake set and rear brake set, respectively, said cylinders having pistons 13 and 14, respectively, axially movable therein for creating uniform fluid pressure for applying the brake sets. The actuating unit for such cylinders, in this embodiment, comprises in part forward ends of thrust rods or finger means 56 and 57 being received in inwardly tapered sockets 37 and 38, respectively, formed in the rear end portions of the pistons 13 and 14, respectively. Finger means 56 and 57 are arranged in the same similar order to brake master cylinders 11 and 12 and their respective pistons as fingers 35 and 36 are disposed thereto, as clearly shown in the drawings. An integral eye 58 is formed in and is in constant engagement with finger means 56, and included as part of finger means 57 is a forked yoke 59 and a saddle 63 affixed thereto. An extension or threaded shank 61 is associated with finger means 57, and extends in a rearwardly manner therefrom and in axial alignment therewith. Shank 61 is shafted through saddle 63, the forward end of said shank being provided with an eyelet 60 which is confined within the interior of yoke 59. Eccentric cam means 68 and 69 are provided for finger means 56 and 57, respectively, and their associated pistons, by which the position of each piston is axially adjustable with the other and with the particular cylinder in which it is located. FIG. 4 shows each piston in fully retracted position in its cylinder, which retraction has been accomplished by rotating each of eccentric cam means 68 and 69 independently of the other, and thereby advancing or withdrawing fingers 56 and 57, respectively.

The concentric inner ends of cams 68 and 69 face each other axially and are received in an annular hole 70 formed in the lever 40. Such ends are connected together by being drawn up in face-to-face contact by a bolt or shaft 71 axially passing through them. Suitable spacers 72 and 73 encircle the concentric inner ends of cams 68, 69 respectively, on opposite sides of lever 40 in order to maintain the finger means 56 and 57 in parallel relationship to each other while at the same time enabling the cammed portions of cams 68 and 69 to be in axial alignment with their respective fingers 56, 57, respectively. Upon forward lateral movement of shaft 71 towards the brake cylinders, the first finger means 56 and eye 58 formed therein will move operatively forward therewith under all conditions of applied braking force to the unit through lever 40.

Fixed limit means for eyelet 60 is provided whereby its rearward movement in yoke 59 is prevented, such means comprising a nut 62 threaded on shank 61 and engaging the interior face of saddle 63. The shank or extension continues to project rearwardly and exteriorly from saddle 63, and about which a yielding means for finger 57 is mounted.

The yielding means or pressure responsive expansile means comprises a prestressed spring 65 coiled or wound about shank 61 and which is stressed thereabouts between the exterior face of saddle 63 and a washer 66 encircling shank 61. The compression in spring 65 is maintained in longitudinally adjusted position by means of a pair of set nuts 67 threaded to the rear end of shank 61. Spring 65 urges saddle 63 against fixed limit means 62 during normal conditions, i.e., prior to attainment of a predetermined intermediate pressure of the system.

A stop means for finger 57 is provided by way of the neck of yoke 59, which means provides for the continuation of the forward movement of finger 57 after the yielding means has yielded and the predetermined unequal braking pressure has been established in the system or, in particular, between the sets of brakes. Under normal conditions, eyelet 60 is held to its extreme right or rear position in yoke 59 by means of spring 65 tensing saddle 63 against fixed limit means 62 on shank 61. A spacing thus exists between eyelet 60 and the neck of the yoke, which spacing is preferably between 1/16 to 1/32 of an inch. Upon a force being applied to shaft 71 through lever 40, the unit as a whole initially advances forwardly towards the brake master cylinders. The yielding means in this instance cooperates with finger 57 in the following manner: Spring 65 maintains its tension against saddle 63, saddle 63 engages nut 62, and eyelet 60 pulls saddle 63, yoke 59 and finger 57, as shaft 71 advances with finger 56. A uniform pressure is developed in the brake system, with a resultant uniform braking ratio being effected simultaneously between the independent sets of brakes. As pressure increases, the tension of spring 65 yields at the predetermined intermediate braking pressure. Eyelet 60 continues to advance with shaft 71, however, finger 57 remains stationary momentarily until eyelet 60 engages its stop means or neck of the yoke. Since finger 56 moves with shaft 71 under all conditions, it has advanced over the distance advanced by finger 57 to the neck of the yoke, the predetermined distance equal to the initial spacing between eyelet 60 and the neck. Thus, piston 13 for the front brake set has a lead over piston 14, so that the front brake set will perform 60% of the braking work whilst the rear set will then do the remaining 40% of the work.

During normal operation of my system, that is, for approximately 80% of the braking situations for an automobile the brake pedal will be only partially depressed and the fork 34 will deliver an equal thrust to both of the master cylinders 11 and 12 and because the pistons and cylinders have the same displacement as do all of the brake cylinders, the result will be equal application of the front and rear brake sets such that the front and rear brake sets will perform a like amount of work.

Figure 5:
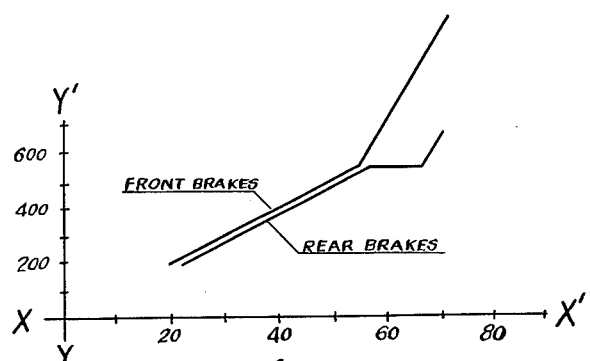
FIG. 5 is a diagram showing brake pedal pressures in pounds on the X—X' co-ordinate plotted against effective braking effort in pounds on the Y—Y' co-ordinate for the front and the rear brake sets of a system utilizing my invention.

For the purpose of describing the operation of my dual safety fluid brake system when emergency or heavy braking is required, let it be supposed that a pressure of 500 pounds must obtain in the hydraulic system serving the rear brakes in order to cause the rear tires to commence sliding under heavy braking stress. This particular condition is illustrated in FIG. 5 when 55 pounds pressure is applied to the brake pedal, i.e. at 55 on the X—X' co-ordinate, and this condition is referred to herein as the maximum braking effort for the rear wheels of an automobile equipped with my system. It is at the attainment of this maximum braking effort that sufficient axial stress is placed on the finger 36 of the body member 34 to overcome the prestressed spring 49 in the form of my invention shown in FIG. 1 whereby the forward braking movement of the finger 36 is momentarily arrested whilst the finger 35 continues its advance. This relative movement between the two arms creates a continued increase in the fluid pressure in the front brake system whilst the fluid in the rear brake system is maintained at a constant pressure. As represented in FIG. 5 when the brake pedal pressure reaches about 65 pounds the braking ratio in the front and back brake sets will have reached a 6 to 4 ratio at which time the terminal end of the extension or rod portion 46 engages the bottom of the bore 54 creating a positive stop for the finger 36, and thereafter under increased braking pressure the 6 to 4 ratio will be maintained up to the full and complete braking capacity of the system. Now with reference to FIGS. 3 and 4, when maximum braking conditions exist in the system the spring 65 will be overcome thus momentarily permitting the finger to remain stationary while the finger 56 continues to advance. This relative movement continues until eyelet 60 engages the neck of the yoke 59 at which time a 6 to 4 ratio will exist in the front and back brake sets, and because of this positive stop the fingers will again move forward together under increased braking requirements to maintain said 6 to 4 braking ratio in the sets.

It is to be understood that the relative distance of travel between the pistons is calculated or predetermined to provide a 6 to 4 braking ratio between the front and rear brake sets such that the front set will perform 60% of the effective braking work whilst the rear brake set will perform the remaining 40% of the braking work to secure optimum braking of the automobile under sudden and/or heavy emergency braking conditions.

Having thus described my invention, what I claim is:

1. In a hydraulic brake system having fluid lines connected to brake master cylinders and through which fluid pressure from the cylinders is applied to independent sets of brakes, a pair of brake master cylinders, each adapted to actuate one of the sets of brakes independently of actuation of the other set of brakes through such fluid lines, said cylinders in parallel juxtaposition to each other, and an actuating unit adapted to directly actuate each of said cylinders whereby a uniform braking action is delivered to each set of brakes before attainment of a predetermined intermediate braking pressure in said system, and an unequal braking ratio or action is established between said sets of brakes after such attainment in said system, said actuating unit comprising (1) a first finger means extending forwardly from said actuating unit and held securely to the piston of the first of said cylinders, (2) a second finger means parallel to said first finger means and extending forwardly from said actuating unit and held securely to the piston of the second of said cylinders, each of said fingers in axial alignment with the piston of its associated cylinder, said fingers operatively movable together forwardly before attainment of the predetermined intermediate braking pressure in said sets of brakes, (3) an extension associated with said second finger means and in axial alignment therewith, (4) yielding means formed of said actuating unit and in cooperative relationship with said second finger until, upon attainment of the predetermined intermediate braking pressure, said first finger and actuating unit continue to move forwardly towards said cylinders in relation to said second finger thereby establishing an unequal braking ratio between said sets of brakes, said yielding means comprising (a) a prestressed spring coiled and retained about said extension, and (b) limit means for said extension cooperating with said spring whereby said second finger operatively moves with the first finger until the yielding means for said second finger means yields upon attainment of the predetermined intermediate braking pressure, and (5) stop means for said extension associated with said second finger means and with which said extension engages after attainment of such intermediate braking pressure.

2. In combination with the actuating unit characterized in claim 1, a lever connected to said unit and having a fixed fulcrum and to which lever a force is applied thereby directing said unit with said finger means in the forward direction as indicated in said claim 1.

3. A body member adapted to directly cooperate with two brake master cylinders the piston of each being parallel to the other, whereby equal and unequal braking pressures are established between two independent sets of brakes, each of such sets being actuated by actuation of one only of said cylinders, said body member comprising (1) first and second fingers each parallel to the other and each extending forwardly from said body member to the piston in its associated brake cylinder and to which each finger is held securely and with which each respectively directly co-acts, (2) a bore in said body member, (3) an extension on said second finger extending axially rearwardly into said bore,
(4) yielding means for said second finger in said bore whereby upon yielding of said means unequal braking pressures are established between the sets of brakes, said means comprising
  (a) a prestressed spring about said extension and stressed between the ends of said bore,
  (b) limit means at one end of the bore co-acting with said spring to prevent said second finger from axially moving into said bore, under which cooperation equal braking pressure exists between the sets of brakes, and
(5) stop means at the other end of said bore adapted to engage the end of said extension upon yielding of said prestressed spring and after said body with said first finger has moved forwardly towards the brake cylinders a predetermined distance, said second finger after such engagement moving forwardly together with said body member and first finger.

4. In combination with the body member characterized in claim 3, a lever connected to said body member and having a fixed fulcrum and to which lever a force is applied thereby directing said body member with said fingers in the forward direction as indicated in said claim 3.

5. An actuating unit adapted to directly cooperate with two brake master cylinders the piston of each being parallel to the other whereby equal and unequal braking pressures are established between two independent sets of brakes, each of such sets being actuated by actuation of one only of said cylinders, said actuating unit comprising (1) first and second fingers each parallel to the other and each extending forwardly from said actuating unit to the piston in its associated brake cylinder and to which each finger is held securely and with which each respectively directly co-acts, said first finger having an eye formed therein, said second finger having formed thereon a yoke and saddle, said yoke and saddle in axial alignment therewith,
(2) a shank having an eyelet thereon, said shank and eyelet in axial alignment with said second finger, said shank shafted through said saddle whereby said eyelet is confined within said yoke,
(3) a first camming means positioned in said eye adjusting the axial position of said first finger,
(4) a second camming means positioned in said eyelet in said yoke adjusting the axial position of said second finger,
(5) a shaft connecting said camming means together, one portion thereof with said second camming means being disposed through said eyelet of said shank whereby upon forward lateral movement of said shaft, said fingers and shank move operatively forward therewith under which condition equal braking pressure exists between the sets of brakes,
(6) yielding means mounted on said shank exterior to said yoke and saddle, whereby upon the yielding thereof unequal braking pressures are established between the sets of brakes, said means comprising
  (a) a prestressed spring about said shank and engaging said saddle,
  (b) means to position said spring longitudinally on said shank thereby tensing said spring, and
  (c) fixed limit means on said shank interior of said yoke and engaging said saddle and cooperating with said spring whereby said second finger operatively moves with the first finger until the yielding means for said second finger yields, and
(7) stop means in the form of the neck of said yoke, which said eyelet on said shank engages upon the yielding of said yielding means and after said unit with said first finger has moved forwardly towards the brake cylinders a predetermined distance, said second finger after such engagement of eyelet to neck moving forwardly together with said body member and first finger.

6. In combination with the actuating unit characterized in claim 5, a lever connected to said shaft and having a fixed fulcrum and to which lever a force is applied thereby directing said actuating unit with said fingers in the forward direction as indicated in said claim 5.

7. An actuating unit adapted to directly cooperate with two brake master cylinders the piston of each being parallel to the other whereby equal and unequal braking pressures are established between two independent sets of brakes, each of such sets being actuated by actuation of one only of said cylinders, said actuating unit comprising (1) first and second fingers each parallel to the other and extending forwardly from said actuating unit to the piston in its associated brake cylinder and to which each finger is held securely and with which each respectively directly co-acts, said first finger having an eye formed therein, said second finger having formed thereon a yoke and saddle, said yoke and saddle in axial alignment therewith,
(2) a shank having an eyelet thereon, said shank and eyelet in axial alignment with said second finger, said shank shafted through said saddle whereby said eyelet is confined within said yoke,
(3) a shaft connecting said eye and eyelet together, one portion thereof being disposed through said eyelet of said shank whereby upon forward lateral movement of said shaft, said fingers and shank move operatively forward therewith under which condition equal braking pressure exists between the sets of brakes,
(4) yielding means mounted on said shank exterior to said yoke and saddle, whereby upon yielding thereof unequal braking pressures are established between the sets of brakes, said means comprising
  (a) a prestressed spring about said shank and engaging said saddle,
  (b) means to position said spring longitudinally on said shank thereby tensing said spring, and
  (c) fixed limit means on said shank interior of said yoke and engaging said saddle and cooperating with said spring whereby said second finger operatively moves with the first finger until the yielding means for said second finger yields, and
(5) stop means in the form of the neck of said yoke, which said eyelet on said shank engages upon yielding of said yielding means and after said unit with said first finger has moved forwardly towards the brake cylinders a predetermined distance, said second finger after such engagement of eyelet to neck moving forwardly together with said body member and first finger.

8. In a hydraulic system, front wheel brakes, rear wheel brakes, interconnected front wheel cylinders for applying said front wheel brakes, interconnected rear wheel cylinders for applying said rear wheel brakes, first and second master cylinders disposed in parallel juxtaposition to each other, and each having a piston therein, a fluid pressure line leading from the first master cylinder to the interconnected front wheel cylinders, a fluid pressure line leading from the second master cylinder to the interconnected rear wheel cylinders, a pedal member, a shaft, means for operatively connecting the pedal member to the shaft, a non-yielding thrust finger for the first piston rigidly secured to one side of said shaft, a yieldable thrust finger for the second piston, means for movably mounting the opposed end of the yieldable finger to the opposite side of the shaft, a stop on the opposed end of said yieldable finger limiting yielding movement of said yieldable finger relative to the shaft, an expansible means urging the yieldable finger in the direction of thrust, fixed means limiting finger thrust movement of the expansile means, and means for maintaining the expansile means under a predetermined stress against said limiting means.

References Cited in the file of this patent

UNITED STATES PATENTS

| | | |
|---|---|---|
| 1,431,029 | Parker | Oct. 3, 1922 |
| 1,722,233 | Pugh et al. | July 23, 1929 |
| 1,969,872 | Bowen | Aug. 14, 1934 |
| 2,160,071 | Irving | May 30, 1939 |